United States Patent [19]

Stoddard

[11] Patent Number: 4,920,407

[45] Date of Patent: Apr. 24, 1990

[54] COMPOSITE VIDEO FRAME STORE

[75] Inventor: James C. Stoddard, Wayland, Mass.

[73] Assignee: GTE Laboratories Incorporated, Waltham, Mass.

[21] Appl. No.: 292,784

[22] Filed: Jan. 3, 1989

[51] Int. Cl.$^5$ .......................... H04N 9/64; H04N 5/91
[52] U.S. Cl. ..................................... 358/21 R; 358/13; 358/160
[58] Field of Search .................. 358/21 R, 22, 13, 160

[56] References Cited

U.S. PATENT DOCUMENTS

| | | | |
|---|---|---|---|
| 4,220,965 | 9/1980 | Heitmann et al. | 358/22 |
| 4,485,402 | 11/1984 | Searby | 358/160 |
| 4,602,275 | 7/1986 | Smith et al. | 358/21 R |
| 4,667,222 | 5/1987 | McCoy | 358/22 |
| 4,746,979 | 5/1988 | Kashigi | 358/160 |

*Primary Examiner*—John W. Shepperd
*Attorney, Agent, or Firm*—J. Stephen Yeo

[57] ABSTRACT

Apparatus stores a composite video frame including synchronization signals, color burst signals, and analog signals. The synchronization signals, color burst signals and analog signals of a video frame are sampled and digitized by circuitry: Two addressable memories are provided. An input register coupled to first and second memories buffers a plurality of digitized samples. An output register coupled to said first and second memories buffers the outputs of the memories. Address circuits provide sequential addressed to the memories for each cycle. During a write cycle, control means provide control signals for enabling the input register to buffer the samples and alternately write enabling the memories to store said samples. During a read cycle, control signals are provided for alternately read enabling the second memories to output the samples and to enable the output register to buffer the output. A circuit converts the output into analog.

3 Claims, 1 Drawing Sheet

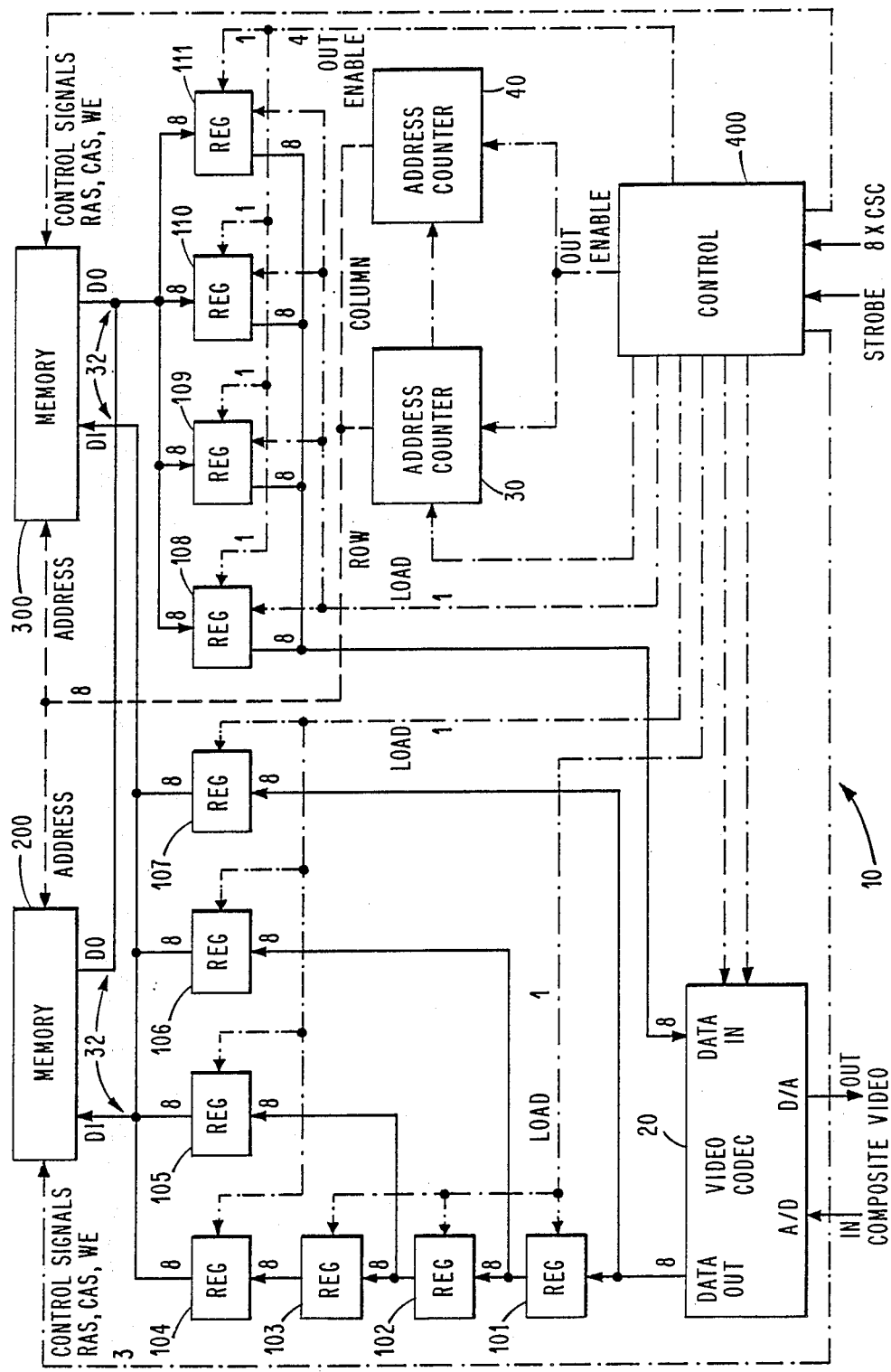

COMPOSITE VIDEO FRAME STORE

BACKGROUND OF THE INVENTION

This invention pertains to a means for electronically storing video images, and more particularly is concerned with means for storing video images in solid state memory.

Solid state memories are at the present time the preferred medium for still frame storage. A number of digitized samples representing a frame of analog video waveform are stored in random access memory. After a complete digitized video frame is stored, it is read out repeatedly and continuously converted to an analog signal until a command is given to store another frame. Special effect generators used in TV studios store digital representations of red, blue, and green TV signals instead of a digital representation of composite video, i.e., a complete video signal with color burst. On the other hand, TV sets with a "picture-in-a-picture" feature employ a frame storage of digitized R-Y, B-Y, and Y signals. Direct storage of digitized composite video is advantageous for the analog output of the frame store to be directly compatible with a TV set after modulation. Accordingly, an object of the invention is to provide apparatus using low cost commercial components for storing composite video signals.

SUMMARY OF THE INVENTION

Briefly, there is provided apparatus for storing a composite video frame including synchronization signals, color burst signals, and analog signals comprising. The synchronization signals, color burst signals and analog signals of a video frame are sampled and digitized by circuitry: Two addressable memories are provided. An input register coupled to first and second memories buffers a plurality of digitized samples. An output register coupled to said first and second memories buffers the outputs of the memories. Address circuits provide sequential addresses to the memories for each cycle. During a write cycle, control means provide control signals for enabling the input register to buffer the samples and alternately write enabling the memories to store said samples. During a read cycle, control signals are provided for alternately read enabling the second memories to output the samples and to enable the output register to buffer the output. A circuit converts the output into analog.

BRIEF DESCRIPTION OF THE DRAWING

FIG. 1 is a block diagram of a frame store circuit embodying the invention.

DETAILED DESCRIPTION OF THE INVENTION

Referring to the single figure, there is seen a frame store circuit 10 embodying the invention which stores composite video frames.

The video frames are sored in a standard television format, such as the NTSC system. The same principle is directly applicable to other television systems like PAL or SECAM.

The NTSC system is described briefly in "Federal Communication Commission, Public Notices" of Dec. 17, 1953 and Jun. 6, 1954. In the NTSC system, each frame is 1/29.970026 second long and consists of two fields with 262.5 horizontal lines each. The lines of two fields are interlaced for a total of 525 lines per frame. Each line starts with a synchronization signal followed by a color burst having a color subcarrier frequency of 3.579545 Mhz. The horizontal frequency is 2/455 times the color subcarrier frequency and there are 119437.5 cycles of the color subcarrier in a frame. Approximately 21 lines occur during a period called the vertical blanking interval (VBI) which is at least 1.33 mS long. These lines do not appear on the television screen, leaving about 483 lines of video information in a frame.

Circuit 10 includes a codec 20, which samples and digitizes an entire incoming composite video frame, including synchronization signals, color burst signals, and analog video signals. The sampling frequency is locked to a multiple of the NTSC color subcarrier frequency. For a multiple of four, the sampling rate is 14,318,180 hz. The color subcarrier also clocks memory cycles and frame retrieval. Digitization is at 8-bits per sample. The digitized waveform is digitally stored in memory. There are 477,750 samples per frame or 3,822,000 bits per frame.

As a feature of the invention, two memories 200, 300 of at least 4k×32 bits are used alternately in a read or write cycle, allowing one to recover from the operation while the other is being used. Four 8-bit samples are stored on a row of each memory. Each memory may use eight commercially available low cost MOS 64K ×4 Dynamic Random Access Memory ICs (TMS4464). This arrangement provides an excess of rows but is cost efficient as it uses low end commercial circuits. Input, output, and address registers are shared by the two memories 200, 300. Control circuit 400 provides control signals RAS, CAS, and WE unique to each memory 200, 300. Seven input registers 101, 102, 103, 104, 105, 106, and 107 are used to retain four 8-bit-sample values in series from codec (analog-to-digital converter and digital-to-analog) 20, and make them available in 32-bit parallel to the memories input. The process of storing a frame is initiated by an externally generated strobe pulse into control circuit 400 which resets the address counters and starts the writing of data into the memories 200, 300. A multiple of the color burst signal clocks the cycles. This writing process lasts for exactly one frame time and then the frame store reverts back to the read mode. The only difference between a read and write operation is that during the write operation, the write enable signals are generated and the outputs of the four input registers 104, 105, 106, and 107 connected to the input of each of the two memories 200, 300 are alternately enabled.

The addressing of the memories is generated by two cascaded eight bit address counters 30, and 40 which are incremented by one after eight sample times (four read or write samples to each of the two memory banks). The outputs of the two cascaded address counters 30, and 40 are multiplexed to provide the row and column addresses respectively to the enabled memory. Both memories 200, 300 are addressed the same for each cycle. The address counters 30, and 40 also serve the purpose of determining the length of a frame. Four of the samples contained in registers 104 through 107 are written into each memory 200, 400 during each memory cycle for a total of eight samples stored.

Refreshing of the dynamic memories 200, 300 is taken care of automatically because the lower order (more rapidly changing) counter 30 is used for the row addrssses.

The number of complete memory cycles used to store one frame is equal to the number of samples per frame (477750) divided by the number of samples (8) stored in one complete memory cycle, which results in 59,718.75 memory cycles per frame. There are therefore only 6 samples in the last cycle (0.75 of an 8 sample cycle). Decoding of the outputs of a 3 bit counter preceding the address counters 30, and 40 are used to generate the timing waveform for the memory. The extra 0.75 of a complete cycle is accommodated by extending the last memory cycle in the frame by 6 sample periods. The result is that 6 sample values from the frame are not stored, and on read operation they are replaced by using 6 of the sample values that have been stored a second time. It is assumed that the frame will always start and stop when the video is at the blanking level. Therefore, samples from one part of the blanking time will be close to the same value as samples from another part. The stretched out cycle is required to avoid violating memory speed requirements that would result if a shortened cycle were used instead.

In the read mode 32 bits (4 sample values) are strobed from each of the two memory bank outputs to four output registers 108, 109, 110, and 111. The outputs of these registers 108, 109, 110, and 111 are enabled one at a time to generate a sequence of digital samples for the digital-to-analog converter 20 which provide analog video frames.

As there are 119,437.5 cycles of the color subcarrier in a frame, a known circuit can be used to correct the 180° phase jump in the subcarriers due to the extra half cycle.

The best mode of practicing this invention and the preferred embodiment has been disclosed. Various modifications will not be apparent to those skilled in the art. Accordingly, the scope of the invention is to be determined by the following claims.

What is claimed is:

1. Apparatus for storing a composite video frame including synchronization signals, color burst signals, and analog signals comprising:

sampling means providing digitized samples of the synchronization signals, color burst signals and analog signals of a video frame;

a first memory addressed by rows and columns;

a second memory addressed by rows and columns;

an input register coupled to said first and second memories for buffering a plurality of digitized samples; an output register coupled to said first and second memories for buffering the outputs of said memories; addressing means for providing sequential addresses to said first and second memories for each cycle; control means for providing, during a write cycle, control signals for enabling said input register to buffer said samples and alternately write enabling said first memory and said second memory to store said samples, and, for providing during a read cycle, control signals for alternately read enabling said first memory and said second memory to output said samples and to enable said output register to buffer said output; and means for converting said output into analog.

2. The apparatus of claim 1 wherein:

said first and second memories have been provided with the same address from said addressing means in a particular cycle.

3. The apparatus of claim 1 wherein said addressing means determines the length of a video frame by accumulating a number correlated to the number of samples.

* * * * *